United States Patent [19]
Doty

[11] Patent Number: 4,608,469
[45] Date of Patent: Aug. 26, 1986

[54] SAFETY BELT BUCKLE WITH SWITCH

[75] Inventor: Gerald A. Doty, Crown Point, Ind.

[73] Assignee: Gateway Industries, Inc., Hazel Crest, Ill.

[21] Appl. No.: 688,692

[22] Filed: Jan. 4, 1985

[51] Int. Cl.[4] .............................................. H01H 3/16
[52] U.S. Cl. ............................ 200/61.58 B; 200/275
[58] Field of Search ........... 200/61.58 B, 16 B, 153 T, 200/332, 61.62, 276, 275; 24/650; 307/105 B; 340/52 E

[56] References Cited

U.S. PATENT DOCUMENTS

| | | | |
|---|---|---|---|
| 2,567,421 | 9/1951 | Brantingson | 200/159 R |
| 2,880,789 | 4/1959 | Leibinger | 200/61.58 X |
| 3,203,064 | 8/1965 | Murphy, Sr. | 24/650 |
| 3,624,601 | 11/1971 | Routzahn | 340/52 E |
| 3,683,144 | 8/1972 | Bowen et al. | 200/332 |
| 3,781,497 | 12/1973 | Stephenson et al. | 200/61.58 B |
| 3,833,781 | 9/1974 | Rumpf | 200/61.58 B |
| 3,840,849 | 10/1974 | Lohr | 340/52 E |
| 3,871,090 | 3/1975 | Romanzi, Jr. et al. | 340/52 E X |
| 3,874,694 | 4/1975 | Stephenson | 200/61.58 B X |
| 3,895,196 | 7/1975 | Lewis | 200/61.58 B |
| 3,956,603 | 5/1976 | Fisher | 200/61.58 B |
| 4,000,385 | 12/1976 | Colasanti | 200/61.58 B |
| 4,001,532 | 1/1977 | Kubota et al. | 200/61.58 B |
| 4,012,612 | 3/1977 | Loomba | 200/61.58 B |
| 4,015,094 | 3/1977 | Gavagan et al. | 200/61.58 B |
| 4,052,775 | 10/1977 | Gavagan et al. | 24/61.58 B X |
| 4,060,878 | 12/1977 | Dyki | 200/61.58 X |
| 4,144,423 | 3/1979 | Fohl | 200/61.58 B |
| 4,163,128 | 7/1979 | Miskowicz | 200/61.58 B |
| 4,514,603 | 4/1985 | Staples | 200/61.62 |

Primary Examiner—A. D. Pellinen
Assistant Examiner—Morris Ginsburg
Attorney, Agent, or Firm—Fitch, Even, Tabin & Flannery

[57] ABSTRACT

A safety belt buckle includes a switch which comprises a compact, substantially enclosed subassembly. The switch is preferably located between the buckle frame and the bottom cover of the buckle. The switch includes a sliding plunger which is adapted to be displaced by entry of the tongue plate into the buckle frame.

15 Claims, 10 Drawing Figures

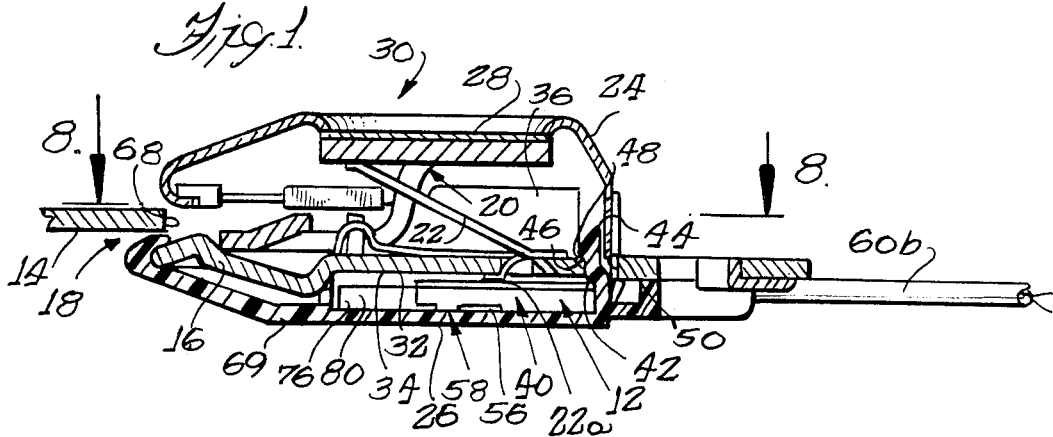
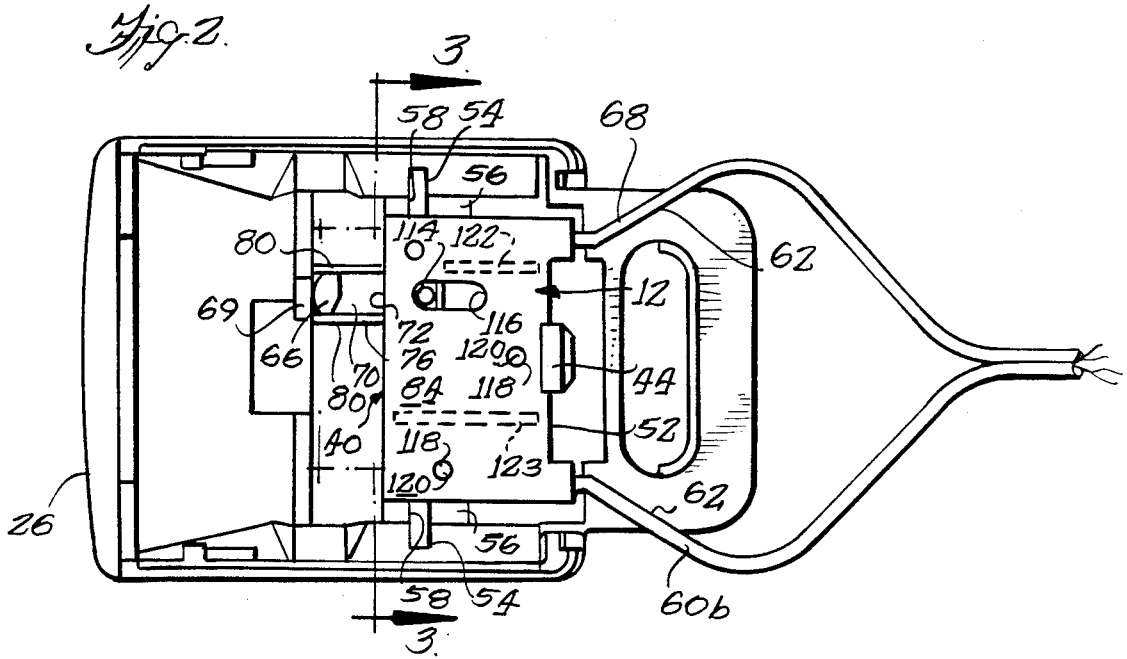
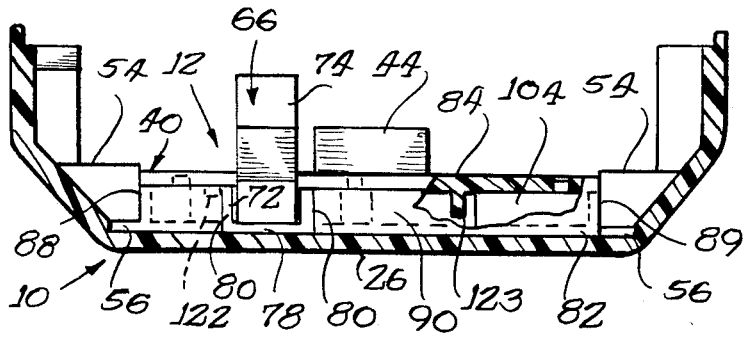

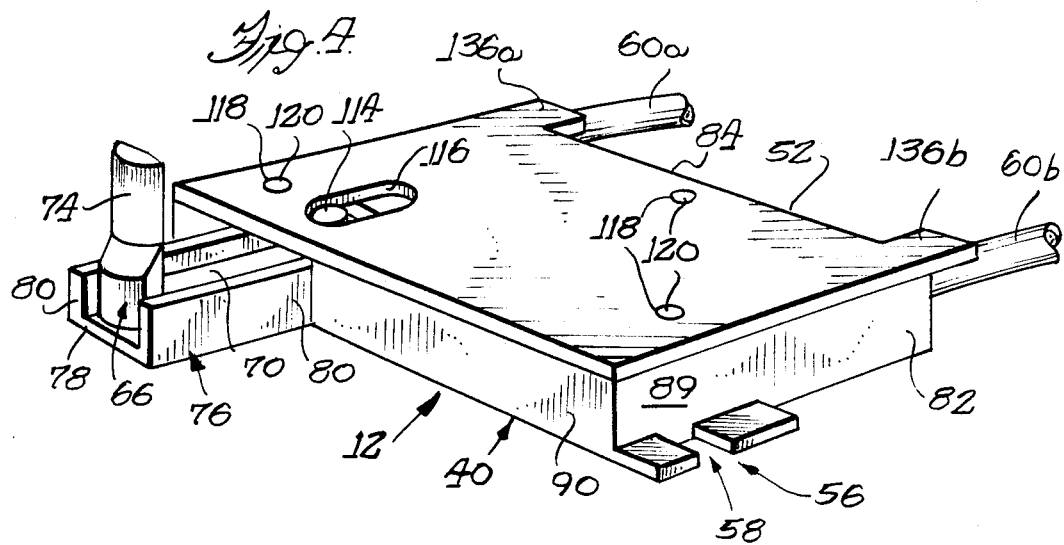
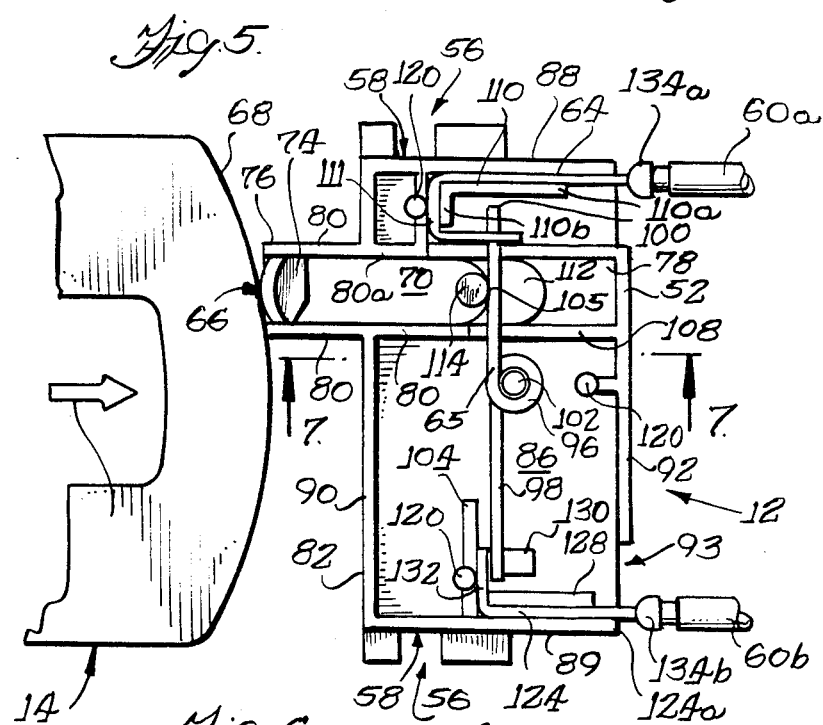
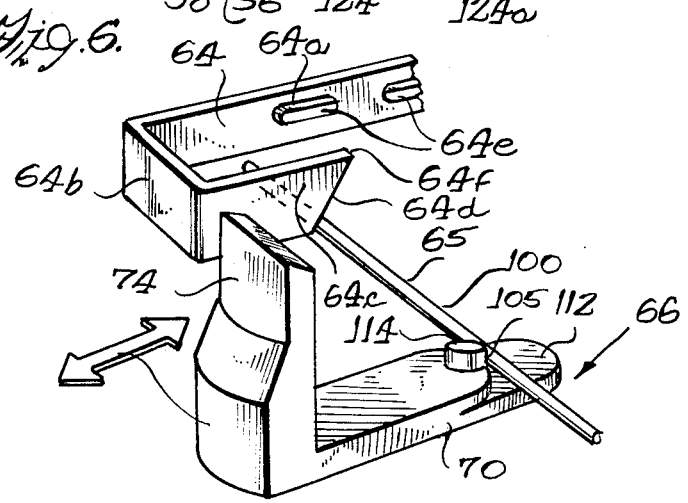

SAFETY BELT BUCKLE WITH SWITCH

BACKGROUND OF THE INVENTION

The invention relates to a safety belt buckle having an electrical switch therein to detect insertion of a tongue plate into the buckle frame.

It is well known for a safety belt buckle to include an electric switch which is actuated by insertion of a tongue plate. Such switches are used in conjunction with buzzers or other warning devices which sound when an occupant of an automobile has not buckled his seat belt. One such switch is described in U.S. Pat. No. 4,163,128, which is assigned to the assignee of the present invention.

A switch in a safety belt buckle should be capable of operation for a period of several years without maintenance while subjected to such adverse environmental factors as dust, temperature extremes, excessive humidity, etc. Dust or corrosion may cause moving parts in a switch to bind to prevent opening or closing thereof, or may interrupt current flow between the contacts. Thus, the switch should be capable of repeated opening and closing without being rendered inoperative by dust, corrosion, or other particulate matter on the contacts. To meet specifications, the switch must be cycled thousands of times under adverse dust, temperature, humidity and other environmental conditions. Also, the switch should be capable of withstanding impact loads applied to the buckle without failure.

It is generally desirable for a safety belt buckle to be compact and lightweight. Accordingly, a switch for use in a safety belt buckle should also have these characteristics. It is also desirable that a buckle be capable of assembly and with relatively little labor, and accordingly it is desirable that the switch not add greatly to the labor involved in buckle assembly. In the past, switches have been generally been assembled by separate installation of each of their various components during assembly of their associated buckles, which is relatively time consuming.

In addition to assembly costs, the cost of the switch itself must be commercially acceptable for manufacture in the millions used in vehicles. Thus, the seat belt switch must meet stiff operational specifications, be readily assembled, and be a low cost switch.

SUMMARY OF THE INVENTION

In accordance with the present invention, a switch is configured to fit compactly into a safety belt buckle as a subassembly which can be fully assembled prior to installation. The switch is relatively compact and is substantially enclosed by cover portions to restrict entry of dust or other particulate matter into its interior.

Accordingly, it is a general object of the invention to provide a novel switch which may be installed in a safety belt buckle as a subassembly.

It is a further object of the present invention to provide a safety belt buckle having a novel switch therein which is capable of installation as a subassembly.

It is a further object of the present invention to provide a safety belt buckle switch which is capable of maintenance-free operation over a period of several years.

Further objects and advantages of the present invention are set forth in the following description and the accompanying illustrations.

BRIEF DESCRIPTION OF THE DRAWINGS

FIG. 1 is a sectional elevational view of a safety belt buckle and switch in accordance with the present invention.

FIG. 2 is a plan view of the switch of FIG. 1, shown in installed relation in a bottom cover of a safety belt buckle.

FIG. 3 is an enlarged sectional view taken substantially along line 3—3 in FIG. 2.

FIG. 4 is a perspective view of the switch of FIG. 1, shown on an enlarged scale.

FIG. 5 is a plan view of the interior of the switch of FIG. 1.

FIG. 6 is a diagrammatic perspective view illustrating operative moving parts of the switch of FIG. 1.

DETAILED DESCRIPTION OF PREFERRED EMBODIMENT

Figure 7:
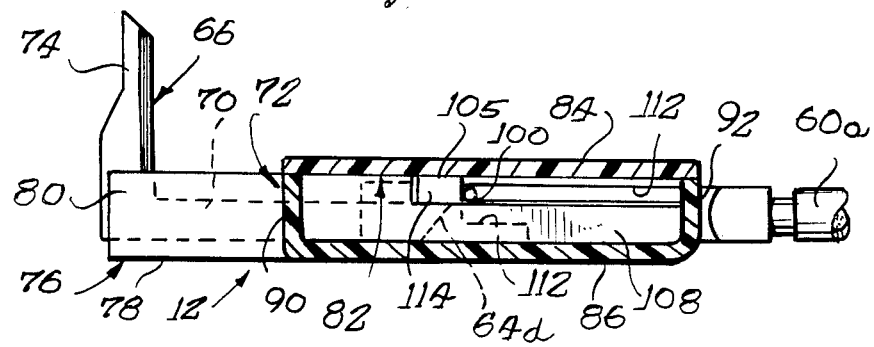
FIG. 7 is a sectional view taken substantially along line 7—7 in FIG. 5 and looking in the direction of the arrows.
Figure 8:
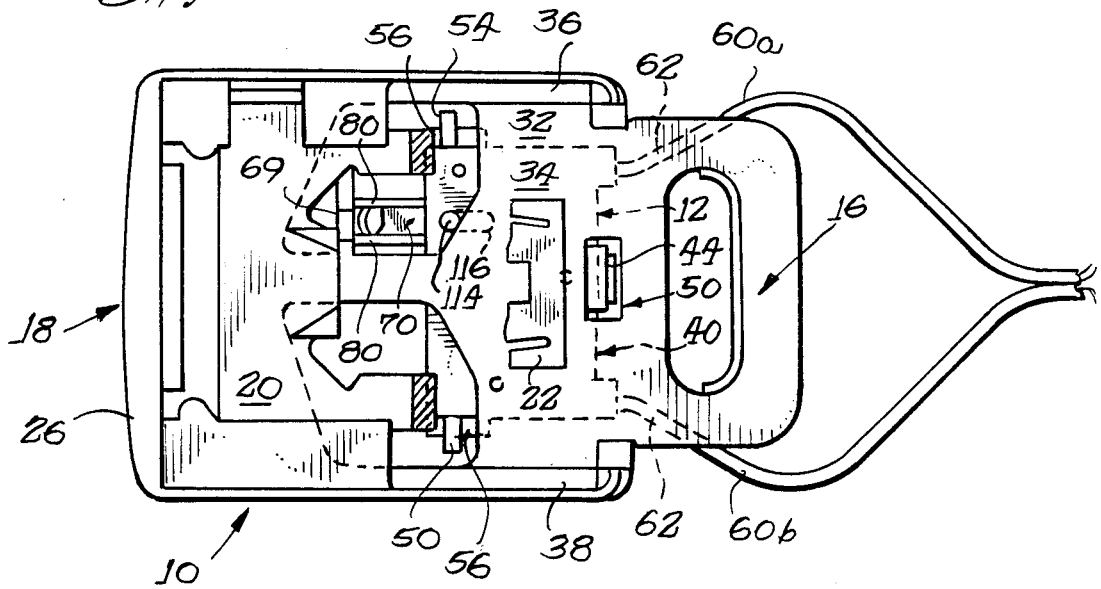
FIG. 8 is a sectional view taken substantially along line 8—8 in FIG. 1 and looking in the direction of the arrows, shown with portions broken away for clarity.

The present invention is generally embodied in a safety belt buckle 10 having sensing means 12 to detect insertion of a tongue plate 14 into the frame 16 of the buckle 10. The buckle 10 described herein is generally of the type described and illustrated in U.S. Pat. No. 4,064,603.

In describing the buckle 10 herein, the words "top" and "bottom" refer to the orientation of the buckle 10 shown in FIG. 1; and the terms "forward" and "rearward" refer respectively to the left and right of the buckle 10 as illustrated in FIG. 1.

The buckle 10 includes a frame 16 having an open forward end 18 for receiving the tongue plate 14, a latch lever 20 for releasably latching the tongue plate 14 within the buckle frame 16, a spring 22 for biasing the latch lever 20, and a two-piece cover assembly comprising a top cover 24 and a bottom cover 26. The latch lever 20 pivots about a horizontal axis so as to be movable between an upper, or latching, position, (shown in FIG. 1) and a lower, or open, position (not shown). The spring 22 biases the latch lever 20 toward the upper position. The lever 20 may be shifted to open position by manual application of downward pressure to a pushbutton 28 which is accessible through an opening 30 in the top cover 24. The frame 16 includes a bottom wall 32 having a generally planar portion 34 near its rearward end, and a pair of sidewalls 36 and 38.

The sensing means 12 of the present invention comprises a switch disposed between the generally planar portion 34 of the bottom wall 32 of the frame 16 and the bottom cover 26. The switch 12 senses insertion or withdrawal of the tongue plate 14 and opens or closes an electrical circuit in response thereto.

Switches in safety belt buckles must not be susceptible to contamination by foreign matter such as dust, and the assembly of the switch parts in the buckle have added significantly to the assembly time of the safety belt buckles. There is a continuing need for improvments in such switches to reduce costs of manufacture, increase durability and life, and simplify assembly of the associated safety belt buckles.

In accordance with the invention, the switch 12 herein comprises a compact subassembly which can be installed relatively easily during assembly of the buckle 10. The switch 12 includes a containment structure or housing 40 which defines an interior space for the contacts 64 and 65. The containment structure 40 restricts entry of foreign matter into its interior to aid in keeping the contacts clean.

During assembly of the buckle 10, it is desirable that the switch 12 be capable of being mounted on the bottom cover 26 and remaining in a predetermined position thereon during subsequent handling of the bottom cover 26 prior to mounting of the bottom cover 26 on the frame 16. In one method of assembling the buckles 10, the bottom cover 26 is inverted during assembly after mounting of the switch 12 thereon. Accordingly, detenting means are provided to prevent the switch 12 from dropping out of the bottom cover 26 when it is inverted. Also, it is desirable that the switch 12 be constrained against lateral movement relative to the bottom cover 26 so that it will remain in a proper position to sense the entry of a tongue plate 14 after assembly of the buckle 10 has been completed.

The means for constraining the switch 12 include a stepped surface 42 (FIG. 1) on an upstanding plastic detent or hook 44 on the bottom cover 26. The hook is flexible and can be flexed by the switch and the buckle frame. One function of the upstanding hook 44 is to fasten the bottom cover 26 to the frame 16. This is accomplished by abutting engagement between a downwardly facing surface 46 on the hook 44 and an upper surface 48 on the frame adjacent an opening 50 in the frame 16 through which the hook 44 passes. The stepped detent surface 42 similarly engages the rear end 52 of the switch 12 to prevent movement of the switch 12 upwardly relative to the bottom cover 26 while the switch is constrained against fore and aft and sideways movement, as will be explained.

The switch 12 is further constrained by cooperation between a pair of inwardly extending lugs 54 (FIGS. 2 and 3) on the bottom cover 26 each received between a pair of notched flanges 56 (FIGS. 4 and 5) on the switch. Each of the notched flanges 56 is dimensioned so that a notch 58 therein receives one of the lugs 54 and with sides of the flanges abutting sides of the lugs to hold the switch against fore and aft movement. This cooperation maintains contact between the rear 52 of the switch 12 and the stepped surface 42 of the hook 44.

When the buckle 10 is fully assembled, the frame 16 contacts the top of the switch 12 while the bottom of the switch 12 remains in contact with the upper surface of the bottom cover 26 of the buckle. The switch 12 is thus constrained against vertical movement by the frame 16 and the bottom cover 26, and the stepped surface 42 on the hook 44 need not be relied upon.

Electric current is carried through the switch 12 by a pair of leads 60a and 60b which are secured within the switch housing to prevent pulling out of the leads from the switch housing when tensile forces are applied to the leads. The leads 60a,b extend rearwardly from the switch 12 through a pair of channels 62 formed at the rear of the bottom cover 26.

Turning to a more detailed description of the switch 12, the switch 12 includes first and second switch contacts 64 and 65 movable relative to one another between open and closed positions, and a switch actuator preferably in the form of a slide or plunger 66 operatively associated with at least one of the contacts 64, 65 so that opening and closing of the switch 12 may be effected by displacement of the plunger 66. The plunger 66 is movable between a forward position corresponding to the closed contact position and a rearward position corresponding to the open contact position, and is adapted for engagement with the leading end or tip 68 of the tongue plate 14 so as to be displaced rearwardly by insertion thereof. The drawings illustrate the plunger 66 in the forward position. The plunger 66 is biased toward its forward position so that the plunger 66 shifts from rearward to forward position upon removal of the tongue plate 14 from the buckle frame 16. Forward travel of the plunger 66 is limited by an upstanding integral lug or stop 69 (FIG. 2) on the bottom cover 26 and this is related to the tongue plate when in its latching position such that the plunger doesn't actuate the contacts until the tongue plate is latched.

The plunger 66 includes a longitudinal portion 70 (FIGS. 4, 5 and 6) which extends through an opening 72 in the switch case 40 and an upstanding member 74 for engagement by the tongue plate 14. As the tongue plate 14 enters, its tip 68 contacts the upstanding member 74, displacing it rearwardly. The longitudinal portion 70 travels rearwardly into the switch interior through the opening 72. Travel of the plunger 66 is guided by a channel 76 which extends through the opening 72. The channel 76 includes a bottom wall 78 and a pair of upstanding side walls 80 integrally with a base 82 of the containment structure 40.

The containment structure 40 includes the base 82 and a cover 84 fastened to the top of the base. The base 82 has a generally planar bottom 86, a pair of generally planar upstanding side walls 88, 89 on opposite sides thereof, a generally planar, upstanding front wall 90 which extends between the side walls 88, 89 but is interrupted by the opening 72, and an upstanding rear wall 92 which extends only part of the distance between the side walls 88, so as to define openings 93 for the leads 60a,b at the rear corners of the containment structure 40.

The rear portion of the plunger 66 is guided by upstanding parallel ribs 106, 108 (FIG. 5) which are contiguous with the side walls 80 of the channel and extend rearwardly therefrom. The rear portions 80a of the channel side walls extend longitudinally into the interior of the case 40 and extend vertically between the bottom 86 of the base 82 and the cover 84. The ribs 106 and 108 are of lesser height, and extend from the rear ends of the channel walls 80 to the rear wall 92 of the case.

The preferred plunger 66 is of generally rectangular cross-section, and the opening 72 in the front of the switch containment structure 40 is also generally rectangular. The channel 76 and the cover 84 of the containment structure 40 cooperate to prevent the plunger 66 from twisting or from moving in any direction other than longitudinally—i.e., forward and rearward.

The opening 72 in the containment structure 40 is dimensioned only slightly larger than the cross-section of the longitudinal portion of the plunger 66. In addition to providing guidance for the plunger 66, this restricts entry of dust or other foreign matter into the switch interior around the plunger 66.

Herein, the contacts 64 and 65 are biased toward a closed position but the switch could be a normally opened rather than a normally closed switch. To effect biasing of the contacts 64, 65 and the plunger 66 herein, the second switch contact 65 comprises a wire spring having a helically wound coil or torsion portion 96 disposed between first and second generally straight end portions 98, 100 (FIG. 5). The coil 96 urges the end portions 98, 100 forwardly. The end portions 98,100 are not perfectly straight, but are subject to varying degrees of flexure due to movement of the plunger 66. The coil 96 herein encircles a short post 102 extending upwardly from the bottom wall 86 of the base 82. The first end portion 98 is constrained by a contact portion 132 and an upstanding transverse rib 104 which projects upward from the bottom wall 86 of the base 82 to the cover 84. The second end portion 100 of the second contact 65 is movable, and engages a rearward surface 105 of the longitudinal portion of the plunger 66. The rearward surface 105 is not a true vertical surface in that it is at an angle of between 70° to 10° in the forward direction to ensure that the end portion 100 never is hung up on the surface 105. The movable second end portion 100 of the second contact 65 is constrained against downward movement by longitudinal ribs 106 and 108.

The movable second end portion wipingly engages the inclined first contact surface 64d to complete the circuit and to keep the contacts clean.

The first switch contact 64 comprises a strip of metal which is positioned on the base 82 adjacent the side wall 88. Movement of the first contact 64 is restricted by the side wall 88, by longitudinal rib 106, by a transverse rib 111 extending between the side wall 88 and longitudinal rib 106, and by an L-shaped rib 110. The L-shaped rib 110 has a longitudinal portion 110a parallel to side wall 88 and spaced therefrom by a distance slightly greater than the thickness of the contact 64, and transverse portion 110b similarly spaced from transverse rib 111.

To these ends, the first contact 64 has a first longitudinal portion 64a located between side wall 88 and the longitudinal portion 110a of the L-shaped rib 110, a transverse portion 64b located between the transverse rib 111 and the transverse portion 110b of the L-shaped rib 110, and a second longitudinal portion 64c extending parallel and adjacent to wall 106. The rearward edge 64d of the second longitudinal portion 64c provides the contact surface for engaging the movable end portion of the second contact 65. The rearward edge 64d herein is beveled so as to be oblique with respect to the horizontal travel of the movable end portion 100.

The hook shaped, first contact 64 is snap fitted into position by means of flexible portions 64e (FIG. 6) which abut the inside surface of the housing side wall 88 when the hook shaped first contact is laid into the slots and channels in the base to receive the same. The thickness of the metal strip of the first contact 64 is such that it fits easily in the channel between the side wall 88 and the rib portion 110a except at the oblong flexible portion 64e which must be flexed inwardly by the side wall 88 as the contact is pushed down into the channel. Herein, the flexible portion 64e is an oblong shaped, pushed-out portion of the contact metal strip. This holds the first contact in position until the cover is attached to the base.

The first and second contacts are made of soft bronze which is a good, inexpensive contact material which is less expensive than the phosphor bronze contact material used in the switch of U.S. Pat. No. 4,163,128 for both contacts.

One problem which arose during earlier development of the switch 12 herein was that the movable end portion 100 was susceptible to becoming jammed, either by binding against the rearward surface 105 of the plunger 66 when the plunger 66 was in its rearward position, or by becoming lodged beneath or above the plunger 66. To prevent the movable end portion 100 from becoming lodged beneath the plunger 66, the rear end of the plunger 66 includes a horizontal surface 112 which extends beneath the movable end portion 100 of the second contact 65. Because the movable end portion 100 is biased forward, it cannot move rearwardly of the horizontal surface 112, and the horizontal surface 112 thus prevents it from moving beneath the plunger 66. The longitudinal ribs 106 and 108 also aid in this function.

Figure 9:
FIG. 9 is a transverse sectional view of the top cover of the switch of FIG. 1.

To preclude the movable end portion 100 of the second contact 65 from becoming jammed between the top of the plunger 66 and the cover 84 of the containment structure 40, a downwardly projecting longitudinal rib 122 (FIGS. 7 and 9) on the cover 84 limits upward travel of the movable end portion 100, and the plunger 66 includes a post 114 extending upwardly above the rearward surface 105. The post 114 extends upwardly into an elongated opening or slot 116 in the cover and travels therein during movement of the plunger 66. The post 114 is guided for rectilinear travel in the slot 116 and this aids in guiding the entire plunger 66 in its travel. The slot 116 is covered by the bottom wall 32 of the buckle frame to prevent entry of foreign materials into the slot 116.

To reduce the possibility of binding between the movable end portion 100 of the second contact 65 and the rearward surface 105 of the plunger 66, the surface 105 is rounded, and the post 102 about which the coil 96 is wound is spaced a sufficient distance from the plunger 66 so that the angular deflection of the second contact 65 at the rearmost position of the plunger 66 is less than 45°.

The cover 84 of the switch case containment structure 40 is retained on the base 82 by a press fit engagement between three openings 118 in the cover 84 and three posts 120 on the base 82. This avoids the need for an expensive welding or use of fasteners. After assembly of the buckle 10, the switch 12 is sandwiched between the planar portion 34 of the bottom wall 32 of the frame 16 and the bottom cover 26 so that the base 82 and cover 84 of the containment structure 40 are held together, and the posts 120 need only prevent lateral movement of the cover 84 relative to the base 82.

As shown in FIG. 1, a tab 22a on the spring extends down through an opening in the frame 16 and abuts the cover 84 of the switch case 40. However, the cover 84 and generally planar portion 34 of the bottom wall 32 of the frame 16 also contact each other, as the tab 22a is relatively thin and the frame portion 34 and cover 84 are not perfectly planar.

To limit upward movement of the end portion 98 of the second contact 65, the cover 84 includes a longitudinal rib 123 (FIG. 9) extending downward from its lower surface adjacent the transverse rib 104. The rib 123 holds end 98 of the second contact 65 down so that it will not catch on pointed end 64f (FIG. 6) of the first contact but will engage the inclined contact surface 64d.

Figure 10:
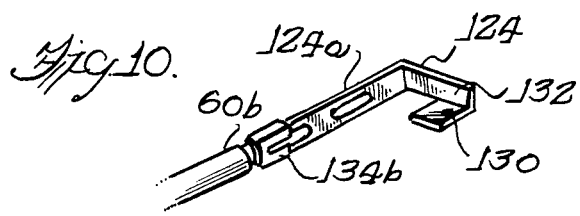
FIG. 10 is a perspective view of a connector used in the switch of FIG. 1.

Electrical connection between the second contact 65 and its associated lead 60b is provided by a connector 124 which engages the end portion 98 of the second contact 65. As best seen in FIG. 5, the lead 60b extends through an opening 93 at the rear of the base 82 and is constrained by the adjacent side wall 89, a parallel rib 128, and transverse rib 104. The connector 124 is generally J-shaped as viewed in plan, with a horizontally disposed, generally planar portion 130 which abuts the bottom wall 86 of the base 82. The horizontal portion 130 intersects a vertically oriented, generally planar transverse portion 132 which lies between the end portion 98 and the rib so that pressure is constantly maintained between the end portion 98 of the second contact 65 and the transverse portion 132 of the connector 124 by the resiliency of the second contact 65. The horizontal portion 130 prevents the end portion 98 from passing under the transverse portion 132. An oblong flexible portion 124a (FIGS. 5 and 10) formed in the metal strip of the connector abuts the side wall 89 to provide a snap fit to hold the connector 124 in the channel defined between wall 89 and the rib 128.

The base 82 of the switch 12 and cover 84 herein are preferably molded from a plastic material. The ribs 104, 110, 111 and 128 and the rear portions 80a of the channel side walls 80 cooperate with the walls 88, 89, 90 and 92 of the base 82 to maintain predetermined spacing between the cover 84 and the bottom wall 86 of the base 82.

The leads 60a and 60b are preferably made of insulated multistrand wire. The contact 64 and connector 124 are preferably made of strips of bronze metal, and each has a crimped sleeve 134a,b (FIGS. 5 and 9) thereon to grip the conductive portion of its associated lead 60a,b.

The sleeves 134a,b extend rearwardly of the rear wall of the switch. To prevent the sleeves from shorting through the buckle frame 16, a pair of insulating ears 136a,b extend rearwardly from the rear corners of the cover 84 of the containment structure 40 between the sleeves 134a,b and the buckle frame 16. These ears 136a,b are preferably integral with the cover 84.

From the foregoing, it will be appreciated that the invention provides a new and improved safety belt buckle. While a preferred embodiment of the invention is described and illustrated herein, there is no intent to limit the invention to this or any particular embodiment.

What is claimed is:

1. In a safety belt buckle the combination comprising:
   a buckle frame having an open forward end;
   said buckle frame being channel shaped and having a central bottom web and a pair of upstanding sidewalls;
   a tongue plate having a tip for insertion into the buckle frame;
   latch means for removably latching the tongue plate tip within the buckle frame;
   a bottom cover mounted substantially beneath the bottom web of said buckle frame and defining therewith an enclosed space between the web and defining therewith an enclosed space between the web of the buckle frame and the bottom cover;
   a switch subassembly mounted in said enclosed space and interlocked with the bottom at a predetermined position on the bottom cover,
   said switch subassembly including a housing and internal electrical switch contacts within the housing and with the housing substantially enclosing and covering the switch contacts from foreign matter, and
   a switch actuator projecting from the switch housing upwardly through an opening in the bottom web and disposed adjacent the latch means so as to be actuated by the tongue plate tip upon insertion thereof into latching engagement with the latch means.

2. The combination of claim 1 in which said switch housing comprises a base with four upstanding side walls and a bottom wall and further comprises a top cover for attachment to the base.

3. In a safety belt buckle the combination comprising:
   a buckle frame having an open forward end;
   a tongue plate having a tip for insertion into the buckle frame;
   latch means for removably latching the tongue plate tip within the buckle frame;
   a bottom cover mounted substantially beneath the buckle frame, so as to define an enclosed space between the buckle frame and the bottom cover;
   a switch subassembly mounted in and interlocked with the bottom cover at a predetermined position on the bottom cover,
   said switch subassembly including a housing and internal electrical switch contacts within the housing and with the housing substantially enclosing and covering the switch contacts from foreign matter, and covering a switch actuator projecting from the switch housing and disposed adjacent the latch means so as to be actuated by the tongue plate tip upon insertion thereof into latching engagement with the latch means, interengaging lugs on said switch housing and on said bottom cover to locate the housing at a predetermined location, and a flexible detent portion between the switch housing and the bottom cover detenting the switch housing to the bottom cover.

4. The combination in accordance with claim 3 including a top cover on said switch housing, said buckle frame having a planar frame portion overlying and abutting the top cover of the switch housing, 5. A safety belt buckle comprising:
   a buckle frame having an open forward end;
   a tongue plate having a tip for insertion into the buckle frame;
   means for removably latching the tongue plate tip within the buckle frame;
   a bottom cover mounted substantially beneath the buckle frame, so as to define an enclosed space between the buckle frame and the bottom cover; and
   a switch disposed substantially in the enclosed space between the buckle frame and the bottom cover, the switch including a plunger positioned so as to be displaced by the tongue plate tip upon insertion thereof into the buckle frame;
   the switch including first and second switch contacts movable relative to one another between an open position and a closed position, said plunger operatively associated with at least one of the contacts so that the opening and closing of the switch is effected by displacement of the plunger, one of said contacts being biased toward one of the open and closed positions, and containment means substantially enclosing and supporting the contacts independently of the buckle frame and bottom cover, the plunger having a portion projecting beyond the containment means so as to be displacable by the tongue plate tip during movement thereof within the buckle.

6. A safety belt buckle in accordance with claim 5 wherein the containment means has an elongated opening formed therein and wherein the plunger includes a boss which extends into the elongated opening for sliding travel therein during displacement of the plunger.

7. A safety belt buckle in accordance with claim 6 wherein the elongated opening is disposed so as to be covered by a portion of the buckle frame.

8. A safety belt buckle comprising:
a buckle frame having an open forward end;
a tongue plate having a tip for insertion into the buckle frame;
means for removably latching the tongue plate tip within the buckle frame;
a bottom cover mounted substantially beneath the buckle frame, so as to define an enclosed space between the buckle frame and the bottom cover; and
a switch disposed substantially in the enclosed space between the buckle frame and the bottom cover, the switch including a plunger positioned so as to be displaced by the tongue plate tip upon insertion thereof into the buckle frame;
the switch including first and second switch contacts movable relative to one another between an open position and a closed position, said plunger operatively associated with at least one of the contacts so that the opening and closing of the switch is effected by displacement of the plunger, one of said contacts being biased toward one of the open and closed positions, snd containment means substantially enclosing and supporting the contacts independently of the buckle frame and bottom cover, the plunger having a portion projecting beyond the containment means so as to be displacable by the tongue plate tip during movement thereof within the buckle, said bottom cover including means for constraining the switch.

9. A buckle in accordance with claim 8 wherein the containment means of the switch is disposed in contact with both the buckle frame and the bottom cover.

10. A switch for use as a subassembly in a safety belt buckle, comprising:
a substantially enclosed switch housing for assembly into a safety belt buckle;
a first contact fixedly mounted within the housing and having an inclined surface thereon;
a second contact mounted on a base and having a movable elongated wire portion for engaging the inclined surface of the first control and biasing means for urging the movable elongated wire portion toward the first contact and to slide obliquely along the inclined surface of the first contact with wiping engagement between the wire portion and the inclined surface;
a first lead electrically connected to the first contact;
a second lead electrically connected to the second contact within the housing:
a movable plunger projecting outwardly of the housing and having a portion within the housing for displacing the movable wire portion of the second contact rearwardly; and
a cover on the housing providing access to said contacts and defining with the housing an enclosure substantially enclosing the contacts.

11. A switch in accordance with claim 10 wherein the enclosure has an opening therein and wherein the plunger includes an elongated portion which extends through the opening and which is movable longitudinally between a forward position and a rearward position, the plunger being cooperative with the second contact to force the movable portion thereof rearwardly, placing the switch in open position, as the plunger moves rearwardly.

12. A switch in accordance with claim 11 wherein the second contact comprises an elongated wire and wherein the biasing means urges the movable portion forwardly in a generally horizontal direction.

13. A switch for use as a subassembly in a safety belt buckle, comprising:
a base;
a first contact mounted on the base;
a second contact mounted on the base and having a movable portion for engaging the first contact and biasing means for urging the movable portion toward the first contact;
a first lead electrically connected to the first contact;
a second lead electrically connected to the second contact;
a movable plunger for displacing the movable portion of the second contact rearwardly;
a cover cooperative with the base to define an enclosure substantially enclosing the contacts,
said enclosure having an opening therein and wherein the plunger includes an elongaged portion which extends through the opening and which is movable longitudinally between a forward position and a rearward position, the plunger being cooperative with the second contact to force the movable portion thereof rearwardly, placing the switch in open position, as the plunger moves rearwardly,
said second contact comprising an elongated wire,
said biasing means urging the movable portion forwardly in a generally horizontal direction,
said first contact having a contact surface which is inclined with respect to the direction of the force applied to the movable portion of the second contact by the biasing means so that the biasing means urges the movable portion of the second contact in an oblique direction relative to the contact surface of the first contact.

14. A switch in accordance with claim 13 wherein the base includes a generally longitudinal rib for limiting downward displacement of the movable portion while the movable portion contacts the first contact.

15. A switch in accordance with claim 14 wherein the cover includes a generally longitudinal rib for limiting upward travel of the movable portion of the second contact.

* * * * *

UNITED STATES PATENT AND TRADEMARK OFFICE
CERTIFICATE OF CORRECTION

PATENT NO. : 4,608,469
DATED : August 26, 1986
INVENTOR(S) : Gerald L. Doty

It is certified that error appears in the above-identified patent and that said Letters Patent is hereby corrected as shown below:

Column 2, line 46 After "The" delete period.

Column 7, line 55-57 After "web" delete --and defining therewith an enclosed space between the web--.

Column 7, line 59 After "bottom" insert --cover--.

Column 8, line 24 After "and" insert paragraph and delete covering".

Column 8, line 37 After "housing" change comma to a period.

Column 9, line 30 Change "snd" to --and--.

Column 9, line 50 Change "control" to --contact--.

Column 9, line 58 Change colon to semi-colon.

Signed and Sealed this

Twenty-third Day of December, 1986

Attest:

DONALD J. QUIGG

Attesting Officer     Commissioner of Patents and Trademarks